Nov. 27, 1928.

R. ETLING 1,693,581

EAR CLEANING IMPLEMENT

Filed March 9, 1928

Witnesses:

Inventor:
Rodolf Etling

Patented Nov. 27, 1928.

1,693,581

UNITED STATES PATENT OFFICE.

RODOLF ETLING, OF BARCELONA, SPAIN.

EAR-CLEANING IMPLEMENT.

Application filed March 9, 1928, Serial No. 260,382, and in Germany November 25, 1927.

This invention relates to an improved ear cleaning implement consisting of a handle and a stem thereon with a thickened front end, while between said handle and stem a cone is arranged for placing a clamping ring thereon, which fastens the ends of an exchangeable piece of cloth, soft leather, or the like, stretched over and around said stem, which is to be introduced into the outer ear channel for cleaning the same. Said handle and stem are either made of one piece or screwed together.

The accompanying drawing illustrates the improved ear cleaning implement.

Figure 1:
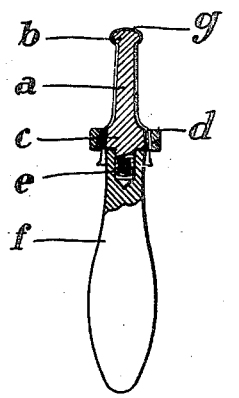
Fig. 1 is a longitudinal section therethrough.
Figure 2:
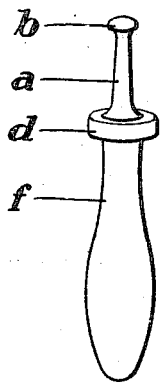
Fig. 2 is a perspective elevation thereof.
Figure 3:
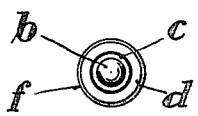
Fig. 3 is a plan view thereof.

The handle $f$ of any appropriate material carries at its front end a stem $a$, which may be slightly conical and which is either made of one piece with, or at $e$ screwed to, said handle. Said stem has at its front end a thickening $b$ and at its rear end a cone $c$, while an exchangeable piece of cloth, soft leather, or the like, $g$ is stretched over and around said stem and held in place by means of a clamping-ring $d$ holding the free ends of said piece of cloth fast upon said cone.

For its use, the stem of the implement with the piece of soft material thereon is introduced into the outer ear channel whereby the latter is cleaned.

What I claim, is:

1. An ear cleaning implement comprising a handle, a stem thereon with a thickened front end, a cone arranged between said handle and stem, a clamping ring on the latter, and an exchangeable piece of soft material stretched over and around said stem and at its ends held in place by said clamping ring.

2. An ear cleaning instrument as specified in claim 1, in which said handle and stem are screwed together.

In testimony whereof I have hereunto set my hand.

RODOLF ETLING.